United States Patent [19]

Onoda et al.

[11] Patent Number: 5,047,894
[45] Date of Patent: Sep. 10, 1991

[54] IC CARD WITH SHUTTER HAVING L-SHAPED FLANGES ENCLOSING THE SIDES OF AN ELECTRODE TERMINAL BOARD

[75] Inventors: Shigeo Onoda; Hajime Maeda, both of Itami, Japan

[73] Assignee: Mitsubishi Denki Kabushiki Kaisha, Tokyo, Japan

[21] Appl. No.: 514,933

[22] Filed: Apr. 26, 1990

[51] Int. Cl.$^5$ ............... H05K 5/00; H01R 13/447; G06K 19/00; G06K 19/04
[52] U.S. Cl. .................... 361/395; 361/392; 361/399; 439/140; 365/52; 235/492

[58] Field of Search ............. 365/52; 220/345, 348; 206/328, 454; 439/137, 140, 141; 361/212, 220, 345, 380, 391, 392, 393, 394, 395, 399, 412, 413, 424; 235/492, 495; 108/143; 248/429, 430

[56]  . References Cited

U.S. PATENT DOCUMENTS 4,695,925  9/1989  Kodai et al. ............. 439/140
4,789,347  12/1988  Banjo et al. ............. 439/137
4,868,714  9/1989  Banjo et al. ............. 361/395

Primary Examiner—Leo P. Picard
Assistant Examiner—Michael W. Phillips
Attorney, Agent, or Firm—Leydig, Voit & Mayer

[57] ABSTRACT

An IC card having a shutter, in which the right and left sides of the shutter are bent to form L-shaped flanges enclosing the sides of an electrode terminal board, the shutter sliding over the electrode terminal board.

6 Claims, 5 Drawing Sheets

FIG. I
PRIOR ART
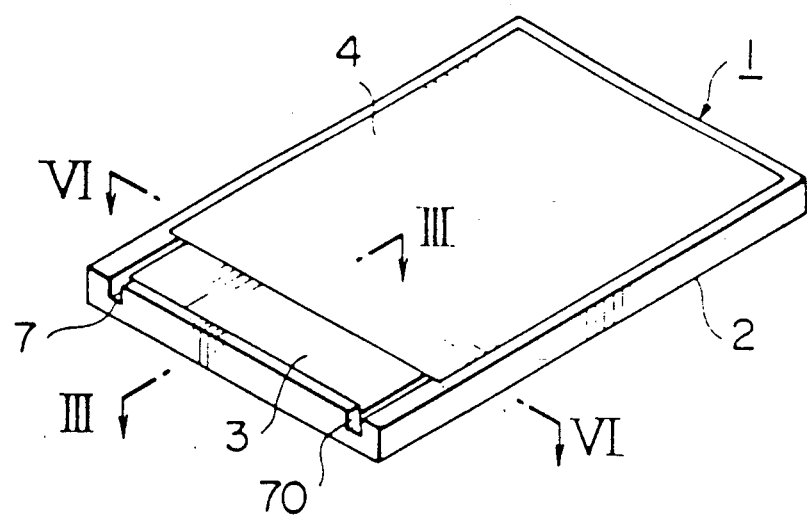
FIG. 2
PRIOR ART
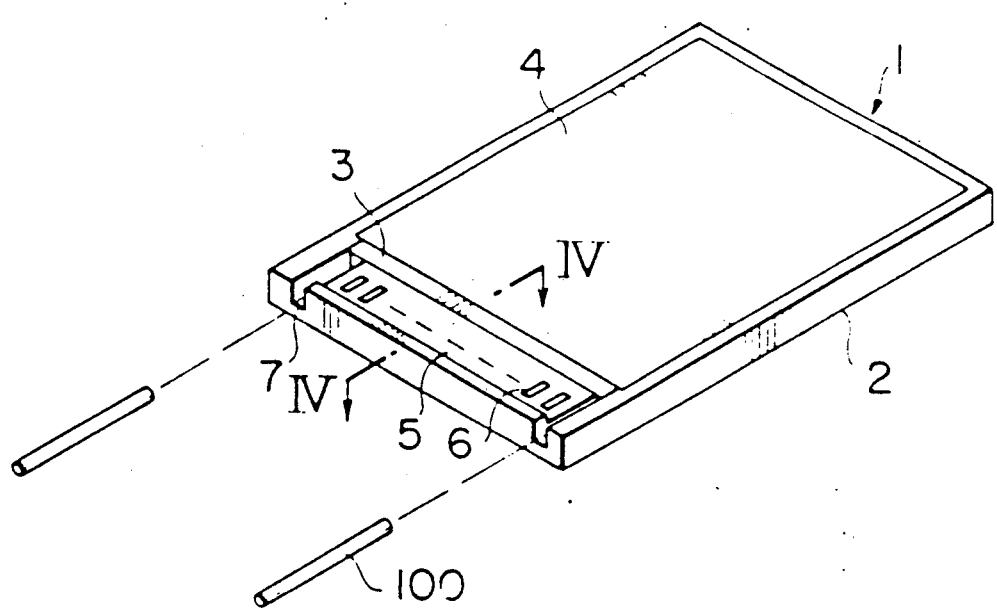

IC CARD WITH SHUTTER HAVING L-SHAPED FLANGES ENCLOSING THE SIDES OF AN ELECTRODE TERMINAL BOARD

BACKGROUND OF THE INVENTION

1. Field of the Invention

The present invention relates to an IC card and, more particularly, to an IC card having a shutter.

2. Description of the Related Art

FIG. 1 is a perspective view showing a conventional IC card 1 having a shutter 3 with the shutter 3 closed. The IC card 1 is constructed of a circuit board (see FIGS. 3 and 4) on which are mounted a plurality of electronic parts. The board is mounted in a frame 2, and panels 4 (generally metallic panels) are attached on the front and back sides of the frame 2 respectively to protect the electronic parts. The shutter 3 which is generally formed of a metallic material is slidably mounted on the front of the card to selectively open and close the IC card 1. FIG. 2 is a perspective view showing the conventional IC card, connected to an external device, having the shutter 3 with the shutter 3 opened. In this condition, a plurality of electrode terminals 6 arranged on an electrode terminal board 5 are exposed to the outside for electrical connection to an external device. The electrode terminal board 5 is mounted on the circuit board. The shutter 3 opens when the IC card 1 is inserted into the external device. The shutter 3 opens by virtue of the fact that a pin 100, disposed on a connector (not shown) of the external device, engages the shutter when the IC case 1 is inserted into the connector. The pin causes the shutter 3 to slide along shutter grooves 7 formed on the sides of the shutter 3 in a direction opposite to that of the insertion direction of the card 1. The shutter grooves 7 each include a respective opening 70 formed on a front sides of the frame 2 where the IC card 1 is inserted. The grooves 7 extend along both sides of the electrode terminal board 5 from the openings 70. Further, when the IC card 1 is pulled away from the external device, the shutter 3 closes due to the restorative tension force of springs 3a (see FIG. 5). One end of the spring 3a is mounted with screws 3b to the frame or the board, while the other end of the spring 3a is mounted on the shutter 3.

FIG. 3 is a cross-sectional view illustrating a shutter portion, taken along line III—III of FIG. 1, with the shutter 3 closed. FIG. 4 is a cross-sectional view illustrating the shutter portion, taken on line IV—IV of FIG. 2, with the shutter 3 open. As described above, the circuit board 8 is mounted to the frame 2 and the circuit board 8 includes obverse and reverse main planes on which the electronic parts 9 are respectively mounted. The electrode terminal board 5, having a plurality of electrode terminals 6 for electrically connecting the electronic parts to the external device, is arranged on one end of the obverse main plane of the circuit board 8. These electrode terminals 6 are electrically connected to the electronic parts 9.

FIG. 5 is a perspective view showing the entire conventional shutter 3 shown in FIGS. 1 to 4. FIG. 6 is a cross-sectional view showing the shutter portion perpendicular to the sliding direction of the shutter 3, taken along line VI—VI of FIG. 1. As shown in FIG. 5, the shutter 3 comprises a shutter body 3c, shutter flanges 3d which are formed by bending the right and left ends of the shutter body 3c with respect to a sliding direction of the shutter body 3c and backward extending portions 3e respectively extending backward on the right and left sides of shutter body 3c. The shutter 3 further comprises spacer portions 3f which are formed by bending parts of the extending portions 3e in the same direction as the shutter flanges 3d and spring fixing portions 3g. As shown in FIG. 6, the shutter flanges 3d are mated with the shutter grooves 7 and travel in the grooves 7. The backward extending portions 3e are provided to prevent the shutter 3 from slanting rightward and leftward during the opening and closing operations of the shutter 3. The spacer portions 3f are provided for a fixed space between the shutter body 3c and the electrode terminals 6 so that the shutter 3 and electrode terminals 6 do not contact each other. Moreover, one end of the spring 3a is mounted on the spring mounting portion 3g and the other end of the spring 3a is mounted with a screw 3b to the frame or the board. Other grooves (not shown), where the spring mounting portions 3g are fitted, may be disposed on the sides of the frame or the board. The spring mounting portions 3g may travel along the above grooves.

In such a conventional IC card having a shutter as described above, in order that the shutter be arranged to open and close over the electrode board without the shutter being lifted up, the distance denoted by character A in FIG. 3, where the panel disposed on the upper surface of the frame overlaps with the electrode terminal board, should be long. Because of the entire IC card structure, however, the distance A cannot be long. Accordingly, the shutter can be lifted up. Furthermore, if a force is added in the direction indicated by the character B in FIG. 3, the shutter may lift up, causing the shutter to be deformed.

SUMMARY OF THE INVENTION

The present invention overcomes the above-described problems and provides a highly reliable IC card whose shutter is prevented from being lifted up.

The present invention provides an IC card having a shutter for connection to an external device comprising at least one electronic part, electrical connection means arranged on the IC card for electrically connecting the electronic part to the external device, the electrical connecting means being selectively exposed to the outside of the IC card, a shutter including L-shaped flanges for covering the electrically connecting means for protection, the flanges covering the edges and portions of the under surface of the electrical connecting means, and L-shaped grooves, receiving the L-shaped flanges bends of the shutter, the grooves extending in the slide direction of the shutter.

The shutter with the IC card according to the present invention is not easily lifted up nor does it get deformed after being lifted up even if a force is applied to the shutter in a direction other than the sliding direction.

BRIEF DESCRIPTION OF THE DRAWINGS

FIG. 1 is a perspective view showing a conventional IC card having the shutter with the shutter closed;

FIG. 2 is a perspective view showing the conventional IC card having the shutter with the shutter opened;

DETAILED DESCRIPTION OF THE PREFERRED EMBODIMENTS

Figure 6:
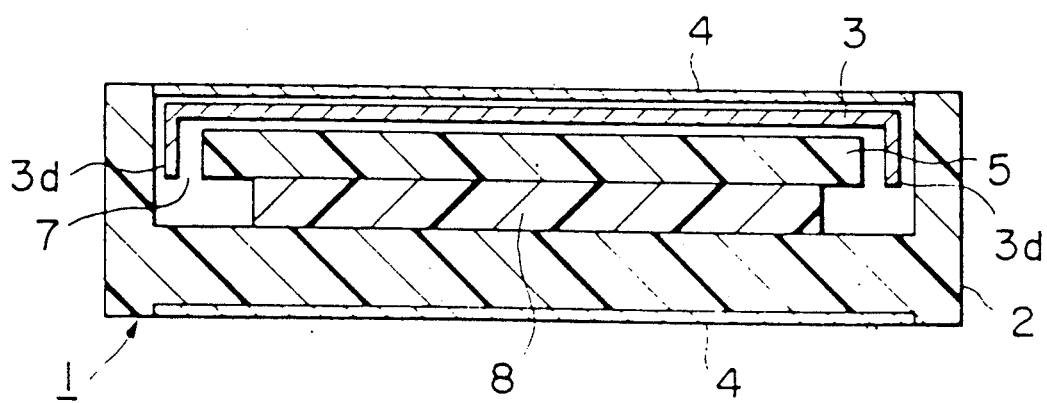
FIG. 6 is a cross-sectional view showing the shutter portion taken along line VI—VI of FIG. 1.
Figure 7:
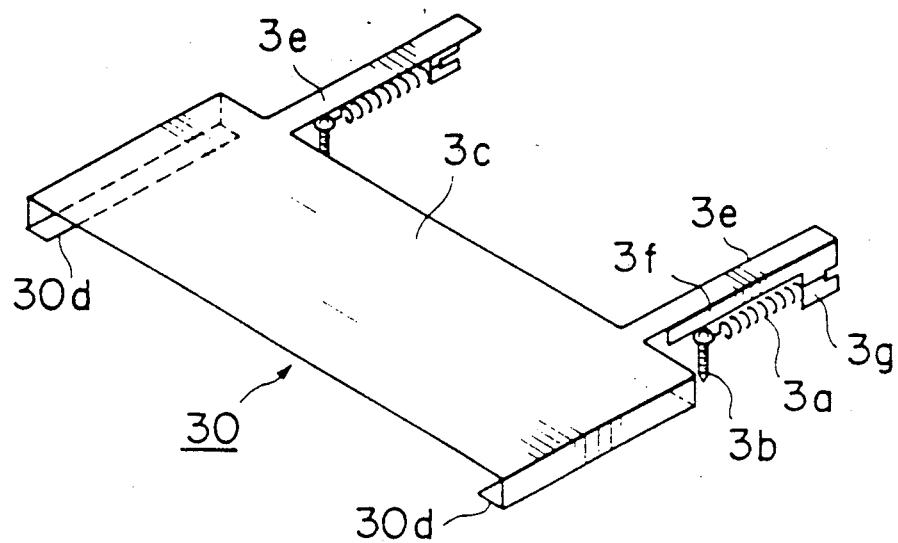
FIG. 7 is a perspective view illustrating an entire shutter to be arranged in an IC card according to an embodiment of the present invention.
Figure 8:
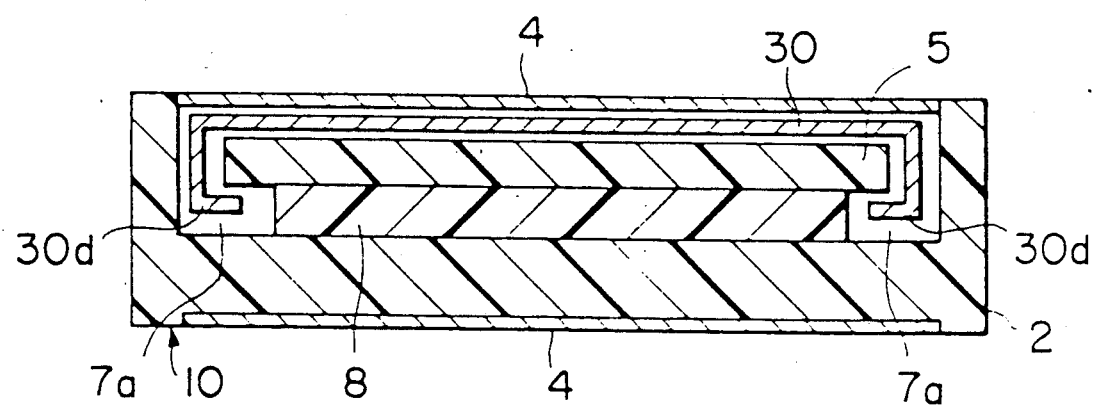
FIG. 8 is a cross-sectional view illustrating the shutter portion with the IC card taken in the same position as FIG. 6.

An embodiment of the present invention will now be described with reference to the accompanying drawings. FIG. 7 is a perspective view illustrating a shutter for an IC card according to an embodiment of the present invention. As shown in FIG. 7, L-shaped flanges 30d are formed along the total length in the open-and-close direction of a shutter body 3c. FIG. 8 is a cross-sectional view illustrating the shutter portion of the IC card taken along a line perpendicular to the sliding direction of the shutter (in the same position as in FIG. 6). As shown in FIG. 8, in the case of an IC card according to the present invention, the width of the circuit board 8 should be narrower than that of the electrode terminal board 5 at least in the shutter portion. Although the same is true in the conventional IC card shown in FIG. 6, conventionally this was not necessarily required. By this arrangement, L-shaped grooves 7a are formed on the right and left sides of the electrode terminal board 5. The L-shaped flanges 30d formed on both sides of the shutter 30 extend along the L-shaped grooves 7a. The shutter 30 is attached to slide, i.e., to open and close freely, over the electrode terminal board 5 and to cover respectively the sides of the electrode terminal board 5. The shape of openings 70 formed on the entrances to the grooves 7a, i.e. an insertion face of the frame 2, is the same as in the conventional type shown in FIG. 1. Other parts are the same as in the conventional IC card, the explanations therefor being omitted.

Figure 3:
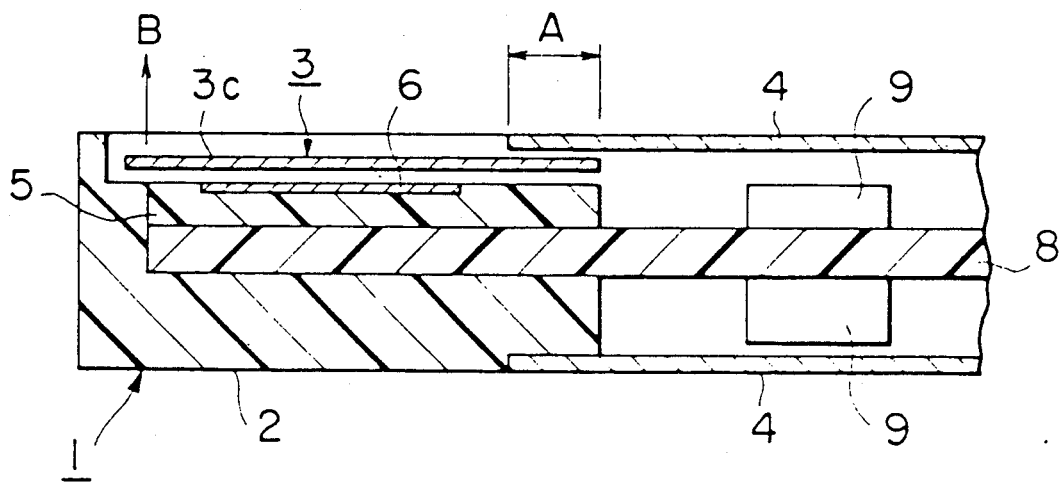
FIG. 3 is a cross-sectional view illustrating a shutter portion taken along line III—III of FIG. 1.
Figure 4:
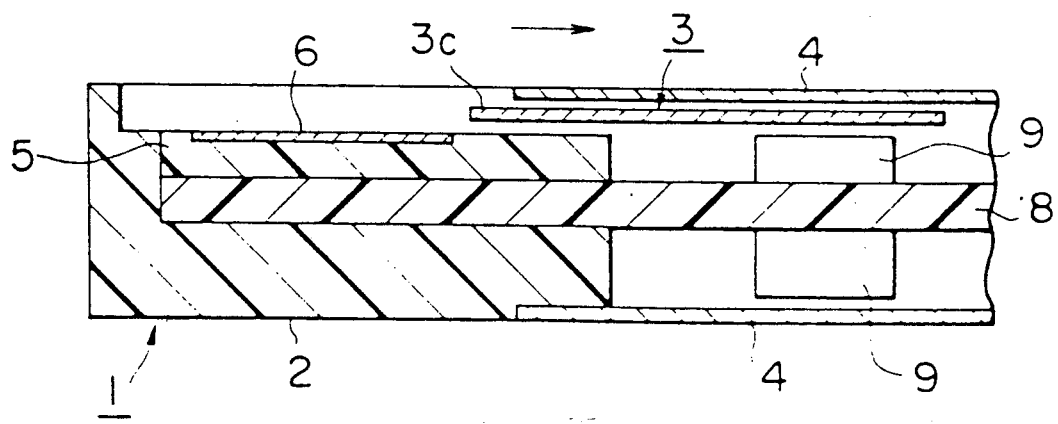
FIG. 4 is a cross-sectional view illustrating the shutter portion taken along line IV—IV of FIG. 2.
Figure 5:
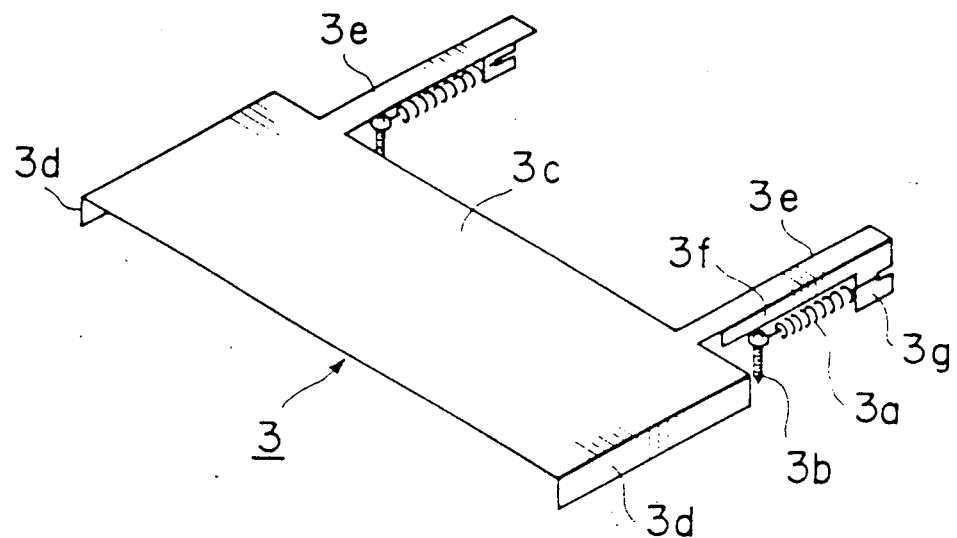
FIG. 5 is a perspective view showing the entire conventional shutter.

In such a shutter 30 as constructed above, even if the distance indicated by character A in FIG. 3, where the panel 4 overlaps the electrode terminal board 5, is short, the shutter 30 does not lift up. Further, the shutter 30 is less liable to become deformed or the like even if a force is applied to it in directions other than the sliding direction thereof because the L-shaped flanges 30d of the shutter 30 are slidingly supported by the under-face of the electrode terminal board 5.

Figure 9:
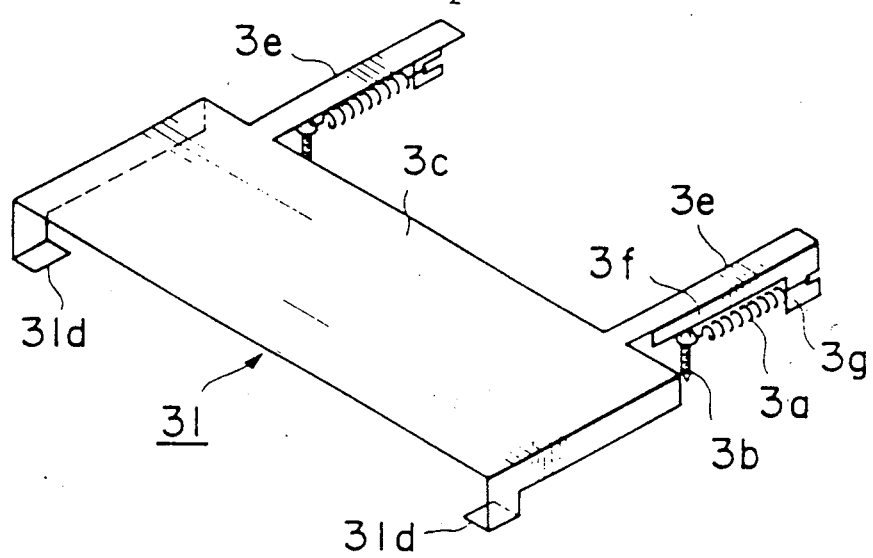
FIG. 9 is a perspective view depicting the entire shutter to be arranged in the IC card according to another embodiment of the present invention.

Although in this embodiment the L-shaped flanges 30d are formed along the total length of the sides of the shutter body 3c, as shown in FIG. 9, L-shaped flanges 31d of a shutter 31 may be formed by bending at least one part of both sides of the shutter body 3c, respectively.

Furthermore, the L-shaped grooves 7a are formed by making the width of the circuit board 8 narrower than that of the electrode board 5. The present invention, however, is not limited to the above-mentioned arrangement. For example, grooves, whose vertical cross section is L-shaped, may be formed differently in accordance with the flanges of the shutter.

Moreover, the structures of the backward extending portions 3e, springs 3a, etc. of the shutters 30, 31 are not limited to the above-described embodiments.

As has been described above, according to the present invention, since the right and left ends of the shutter, with respect to the sliding direction thereof, are bent to enclose the ends of the electrode terminal board, the shutter does not lift up, whereby a highly reliable IC card is provided.

The invention has been described in detail with particular reference to the preferred embodiments thereof, but it will be understood that variations and modifications of the invention can be made within the spirit and scope of the invention.

What is claimed is:

1. An IC card for connection to an external device comprising:

an IC card including at least one electronic part;

electrical connection means disposed on said IC card for electrically connecting said electronic part to an external device;

a sliding shutter having a main surface and including opposed first and second edges, and L-shaped flanges extending from said first and second edges for selectively covering said electrical connection means; and L-shaped grooves in said IC card receiving said L-shaped flanges of said shutter, said grooves extending in the direction of sliding of said shutter.

2. An IC card according to claim 1 including a circuit board having obverse and reverse surfaces and opposed edges joining said obverse and reverse surfaces, said board having said electrical connection means mounted thereon, a frame encircling said circuit board, and a panel disposed on said frame covering said circuit board, part of said electrical connection means, and part of said shutter;

said electrical connection means including an electrode terminal board having a surface on which a plurality of electrode terminals electrically connected to said electronic part are disposed and having edges, said electrode terminal board being wider, transverse to the direction of sliding of said shutter, than said circuit board;

said L-shaped grooves including openings formed on a card insertion face of said frame, said openings being spaced from said electrode terminal board and said circuit board; and said L-shaped flanges lying at opposite edges of said electrode terminal board, spring means connected to said shutter and IC card urging said shutter to cover said electrode terminal board.

3. An IC card according to claim 2 wherein said L-shaped flanges on said shutter body extend along the entire length of the edges of said shutter body.

4. An IC card according to claim 2 wherein said L-shaped flanges on said shutter body extend along only part of the length of the edges of said shutter body.

5. An IC card according to claim 2 wherein when said IC card is inserted into said external device, pins arranged in said external device slide said shutter flanges in said L-shaped grooves opposite the direction of the card insertion exposing said electrical connection means and when said IC card is pulled away from said external device, said spring means urges said shutter to cover said electrical connection means.

6. An IC card according to claim 2 wherein said shutter and said panel are both metallic.

* * * * *